United States Patent [19]

Lee

[11] Patent Number: 4,579,198
[45] Date of Patent: Apr. 1, 1986

[54] COLLAPSIBLE TREE STAND ASSEMBLY

[76] Inventor: Roy M. Lee, Shobe Rd., Alexander, Ark. 72002

[21] Appl. No.: 773,033

[22] Filed: Sep. 6, 1985

[51] Int. Cl.⁴ .................. A63B 27/00; A47C 9/10; A45F 3/26
[52] U.S. Cl. .................... 182/115; 182/187; 108/135; 108/152
[58] Field of Search .............. 182/187, 188, 115, 116, 182/133, 136, 129; 108/152, 135

[56] References Cited

U.S. PATENT DOCUMENTS

| | | | |
|---|---|---|---|
| 3,030,160 | 4/1962 | Tandy | 182/187 |
| 3,352,379 | 11/1967 | Riggs | 182/187 |
| 3,817,350 | 6/1974 | Gray | 182/187 |
| 4,022,292 | 5/1977 | Van Gompel | 182/187 |
| 4,134,474 | 1/1979 | Stavenau | 182/187 |
| 4,369,858 | 1/1983 | Babb | 182/187 |
| 4,458,782 | 7/1984 | Meyer | 182/187 |
| 4,493,395 | 1/1985 | Rittenhouse | 182/187 |

Primary Examiner—Reinaldo P. Machado
Attorney, Agent, or Firm—Stephen D. Carver

[57] ABSTRACT

A readily transportable, foldable tree stand for hunters. The stand preferably comprises a first, lower frame member adapted to be unfolded for deployment as a foot rest, and a second, cooperating frame member pivotally coupled in offset relation to said first frame member. The stand may be suspended upon the trunk of a tree or similar vertical support by suitable brackets adapted to grasp an adjustable-length support chain which circumferentially, frictionally surrounds the tree trunk. The second frame member is adapted to assume a generally vertical position after unfolding to function as a back rest for the hunter when deployed. A pair of rigid, cooperating, lateral support struts extend diagonally at the sides of the tree stand between the first and second frame members. Each support strut is articulated, consisting of first upper portions pivotally connected to second lower portions. A rigid, generally rectangular seat pivotally coupled between the first portions of the support struts includes rearwardly projecting brackets adapted to be removably coupled to an appropriately positioned intermediate brace of the second frame member. Because of the offset pivoting of coupled members disclosed, the entire apparatus is quickly folded between relatively flat "horizontal" positions and the installed "tree engaging" position.

13 Claims, 6 Drawing Figures

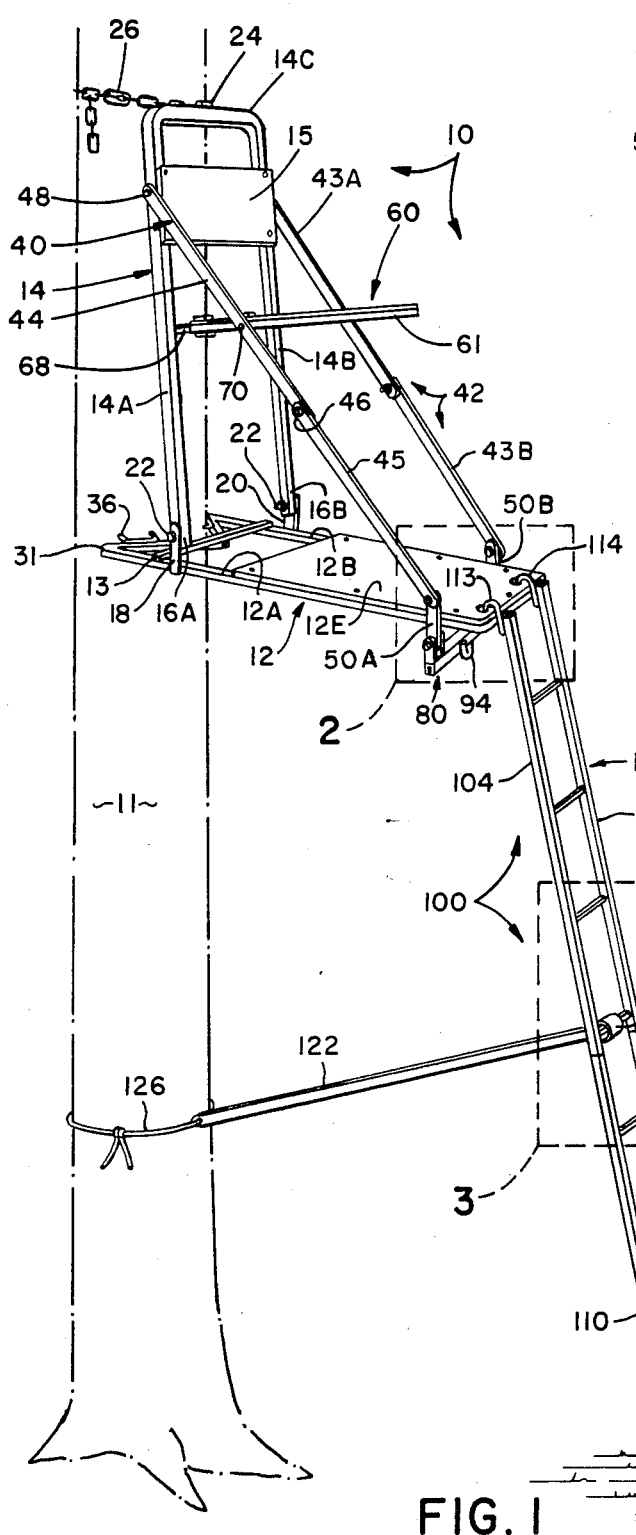
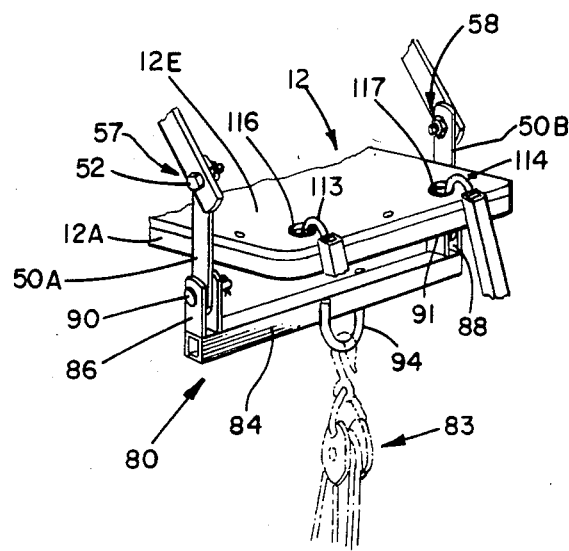
FIG. 2
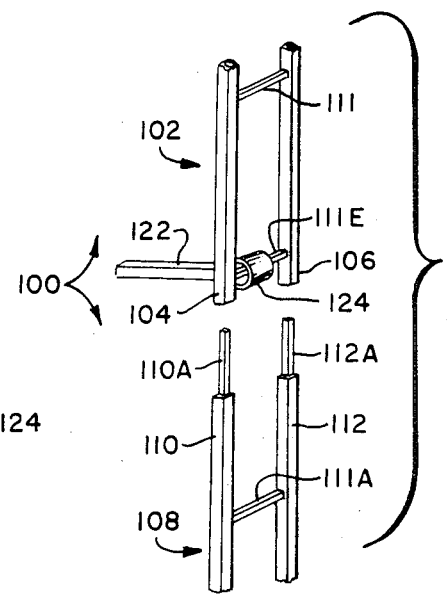
FIG. 3
FIG. 1

COLLAPSIBLE TREE STAND ASSEMBLY

BACKGROUND OF THE INVENTION

The present invention relates generally to tree stands of the type adapted to be supported upon the trunk of a tree (or a similar vertical support) for seating the hunter above ground. More particularly, the present invention is directed to a collapsible, portable tree stand which may be easily installed upon a desired tree and easily accessed by the user and which securely and safely seats the hunter in a comfortable and safe position readily facilitating the observation of the area surrounding the tree.

As will be readily be appreciated by those familiar with the art, tree stands provide a number of practical advantages to the hunter. For example, the skilled hunter who must wait for relatively long periods of time until a suitable game animal approaches will find it desirable to assume a comfortable position where his view of the surrounding area is relatively unobstructed, and where his relative safety is assured. In areas of dense woods, it is particularly advantageous for the observer to elevate himself well above the ground so that he may have unobstructed command of a sufficient area of woods.

For a variety of reasons the use of the conventional large, platform-type observation blinds may be impractical and inconvenient. Such tall platform stands or blinds are normally permanently installed in a particular area, so that the user may be required to purchase or lease the land where the platform is to be constructed. Hence, the use of these platforms or blinds is often impractical and may involve a great deal of expense. While such platform-type stands generally permit a relatively wide scope of observation, it is evident that their use restricts the observation to one particular geographical area.

It is well known by hunters that portable, easily installed tree stands facilitate greater user freedom, require less financial sacrifice, and waste less hunting time. If properly assembled and correctly situated, a portable tree stand can provide the user with a clear view of a broad area, enhancing the hunter's chances of success. However, it is imperative that a suitable tree stand or seat be safe, comfortable, easily deployed, and easily accessed. Accordingly, the prior art suggests a wide variety of tree stand devices, which devices employ a variety of different structural elements for securing the stand upon a desired tree and a number of devices for safe and convenient user access.

Southard, U.S. Pat. No. 3,871,482, Gray, U.S. Pat. No. 3,817,350, and Eastridge, U.S. Pat. No. 4,475,627 all depict general tree stand devices. Meyer, U.S. Pat. No. 4,458,782 and Shinkle, U.S. Pat. No. 4,474,265, provide support for the user's legs and equipment. Other basic tree stand inventions are also illustrated in U.S. Pat. Nos. 4,124,094 and 3,961,686 and design patent 270,474.

The most relevant prior art known to me comprises tree stands which are adapted to be folded together and thus more conveniently transportable and which include some type of ladder or other device for vertical access. Inventions typified broadly by the aforementioned characteristics include Starkey, U.S. Pat. No. 3,961,686, Campbell, U.S. Pat. No. 4,061,202, and Stavenau, U.S. Pat. No. 4,134,474.

However, most prior art tree stands known to me are rather inefficient, cumbersome to operate, and generally do not permit sufficiently broad range of observation. A suitable tree stand must be lightweight, easily transportable, and it must be capable of simple, quick deployment without the use of numerous additional hand tools.

Most importantly, it must be easily accessible by the user, particularly in areas where the woods are dense and a higher elevation is desired for observation. Additionally, the stand must be securely mounted, stable and capable of rigidly maintaining itself in a constant position to adequately support the user.

SUMMARY OF THE INVENTION

The present invention comprises a collapsible, portable stand assembly which can be readily manually transported by a hunter to a desired area, and thereafter unfolded and installed upon the trunk of a selected tree (or similar vertical support) in an elevated position above the ground.

Preferably the present invention comprises a first generally rectangular frame member having a generally M-shaped inner end, and a second back supporting frame member of approximately the same dimensions which is pivotally coupled to the first frame member. The device is adapted to be suspended upon the trunk of a tree or similar vertical support by an adjustable chain which is connected to and extends rearwardly from the top of the second frame member and is secured circumferentially about the tree trunk. The M-shaped inner end of the first frame member is adapted to frictionally contact the tree trunk, and it preferably includes outwardly projecting teeth which engage the tree.

When the tree stand apparatus is unfolded and deployed the first frame member will extend horizontally outwardly from the tree and function as a foot rest. After appropriate unfolding the second frame member will be deployed substantially vertically, rearwardly abutting the tree trunk. The second frame member includes a solid, planar, generally rectangular backboard which faces and supports the hunter's back.

The first frame member includes a pair of cooperating, spaced-apart pivot braces welded upon its opposite sides near the outer end thereof. A pair of elongated spaced apart, articulated lateral support struts are pivotally coupled at one end to opposite upper sides of the second frame member, and are pivotally coupled at their opposite ends to upper portions of the pivot braces. Each of the lateral support struts include first and second elongated strut members which are pivoted together. A substantially rectangular seat is permanently pivoted between the first strut members of the lateral support struts, and the seat terminates rearwardly in suitable brackets for operationally engaging a rigid, centrally located intermediate crosspiece extending transversely between opposite sides of the second frame member. Thus when the apparatus is deployed, the seat will be tilted to a substantially horizontal position elevated above the lower first frame member (i.e. the foot rest), and it will firmly engage the aforementioned crosspiece to securely support the seated hunter.

In the best mode of the present invention the lower ends of the pivot braces extend downwardly below the lower surface of the foot rest to provide a pivotal connection for a swing mount bar. The swing mount bar is provided with a suitable ring for receiving the hook of a swivel pulley, which may be used, for example, by a hunter to clean and dress a deer or for keeping supplies suspended in a safe position above the ground level. The swing mount bar is temporarily, pivotally mounted between the pivot braces by means of a conventional drop pin and clasp combination and is thus adapted to be easily installed or removed by the user.

Ingress and egress is facilitated by an elongated, ladder comprised of a plurality of individual segments axially fitted together by the hunter. The hollow interior of the channels of the upper ladder section is adapted to be slidably mounted upon pegs permanently affixed to and upwardly extending from the upper ends of the lower ladder section, the outer dimensions of the pegs being only somewhat smaller than the interior of the channels of the upper ladder section, so that the two sections are conveniently but firmly fitted together. The assembled sectional ladder is adapted to be secured to and suspended upon the foot rest (i.e. the first frame portion) to provide the user safe access to the tree stand from the ground. The sectional ladder also permits the user to comfortably scale the tree trunk to initially install the tree stand to an appropriate elevation thereon.

Additional support may be provided by the employment of an elongated, rigid rod which is permanently connected at one end to a tubular collar pivotally mounted about the lowermost rung of one of the ladder segments and which is provided with a suitable orifice at the opposite end through which the user may thread a rope or similar flexible cord to temporarily secure the rod to the tree trunk. In the deployed position, this reinforcement rod secures the sectional ladder in an upright position and provides greater comfort and stability.

Once removed from its elevated position upon the tree, the tree stand device may be folded to a substantially flat position for convenient storage or transport. The center pivotal joints of the lateral support struts are pulled outward and upward away from the device, thus pulling the first frame portion upwardly toward the second frame portion. The seat wll thus pivot upwardly toward the back rest. The ladder sections may then be disassembled and laid flat upon the device. The reinforcement rod, which is of substantially the same length as the ladder sections, may be conveniently pivoted towards the upper ladder section so that it rests upon the rungs and lies in a substantially flat position. Thus the device may be easily stored or conveniently transported by the user.

Thus, a broad object of the present invention is to provide a dependable and reliable tree stand device which is easily transportable.

A more basic object of the present invention is to provide an easily transportable hunter's tree stand which may be quickly unfolded into an easily deployable position.

Another basic object of the present invention is to provide a tree stand of the character described which may be easily assembled and quickly deployed with a minimum expenditure of physical effort.

Yet another fundamental object of the present invention is to provide a dependable tree stand of the character described which insures relative security and safety for the user.

Yet another object of the present invention is to provide a tree stand of the character described which is readily adaptable for use with trees of different diameters.

Another object is to provide a tree stand of the character described which may be readily carried, easily deployed, and readily disassembled by a single individual possessing average strength and physical endurance.

A still further object of this invention is to provide a tree stand of the character described which can be used at ground level as a camp chair.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a pictorial view of the tree stand device constructed in accordance with the best mode of the present invention, with portions thereof broken away or omitted for clarity, with the device illustrated in an operational position deployed upon a suitable tree;

FIG. 2 is an enlarged fragmentary isometric view of a portion of the tree stand identified generally by Block 2 of FIG. 1, illustrating the placement of the swing mount bar between the pivot braces of the first frame portion;

FIG. 3 is an enlarged fragmentary isometric view of a portion of the tree stand identified generally by Block 3 of FIG. 1, illustrating individual segments of the preferred ladder assembly and a portion of the reinforcement rod;

DETAILED DESCRIPTION

Figure 5:
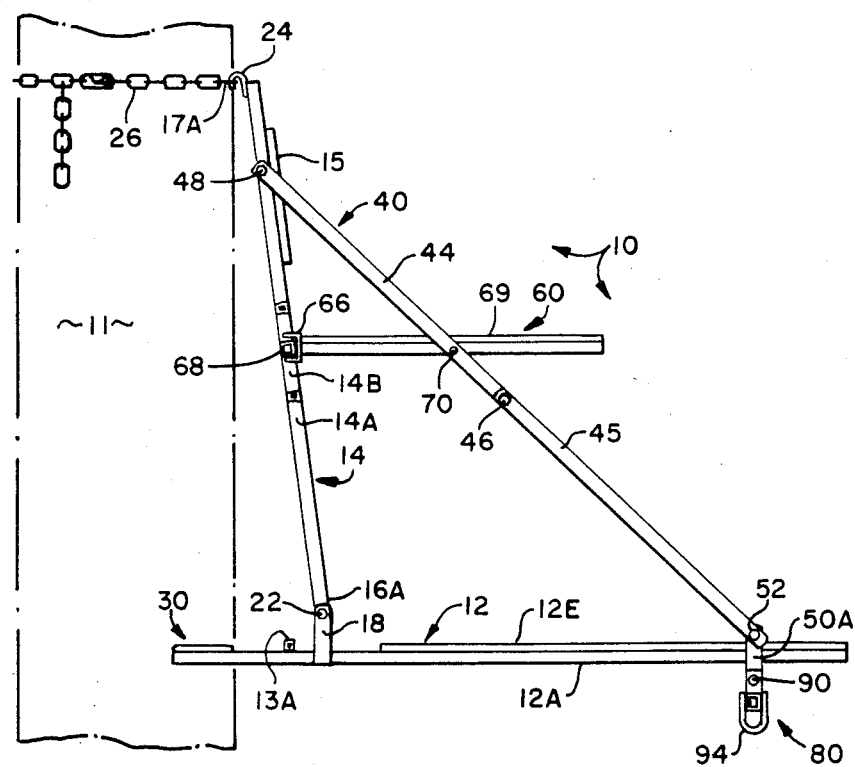
FIG. 5 is a side elevational view of the tree stand device in its deployed position; and, FIG. 6 is an enlarged sectional view illustrating the tree stand device in a preliminary position where it is about to be unfoldably deployed upon a suitable tree in solid lines, and illustrating the intermediate position in dashed lines.

With initial reference now directed to FIGS. 1 and 5 of the drawings, a collapsible, portable tree stand constructed in accordance with the preferred teachings of the present invention has been generally designated by the reference numeral 10. When a suitable tree 11 or similar vertical support has been selected in the desired observation area, stand 10 may be deployed in the manner hereinafter described in detail at an elevation thereupon which will permit effective command of a relatively large surrounding area. Tree stand 10 is adapted to be transported in a folded position and quickly and reliably deployed by the hunter once the desired hunting area is reached. Before unfolding, and immediately prior to attachment to a tree the stand will have assumed the "folded" configuration shown in solid lines in FIG. 6, and it may thence be unfolded for deployment as illustrated best in FIGS. 1 and 5. When assembled and installed, stand 10 assumes a generally triangular profile.

The stand apparatus 10 comprises a rigid, generally rectangular first frame member 12 which includes a pair of parallel, spaced apart sides 12A and 12B, and a cooperative, generally rectangular second frame member 14 which provides a back support when the stand is deployed. The sides of frame member 12 are braced by a pair of cross pieces 13A and 13B. Frame member 14 includes a pair of spaced apart and parallel sides 14A and 14B, which are integral with an upper transverse top 14C. Frame member 14 includes a solid, rigid, planar backboard 15 spaced apart from top 14C, which is secured at its opposite ends to sides 14A and 14B. Frame member 12 functions as a foot support, and it includes an upper surface 12E upon which the feet of the hunter may be placed, and a front or outer portion projecting away from the tree trunk as seen in detail in FIG. 2.

The bottom ends 16A and 16B of the sides 14A and 14B respectively are pivotally associated with the first frame member 12, being appropriately pivotally coupled to offsets 18 and 20 which are permanently attached to first frame member sides 12A and 12B respectively, establishing a pivot axis, generally indicated at 22, so that frame members 12 and 14 may be folded relative to one another. A broad, rigid hood 24 is welded to the top 14C of the second frame member, and it is adapted to be slidably fitted into a suitable chain link 17A on chain 26 which must be deployed circumferentially about the tree trunk in order to suspend the apparatus from the tree. Chain 26 is provided with a conventional clasp to permit the user to secure the stand assembly 10 to a selected supporting tree of any of a variety of sizes and shapes.

The inner end 30 of the first frame member 12 is of generally M-shaped profile, comprising a pair of integral elbows 31 and 32 separated from one another by an intermediate notch generally designated by the reference numeral 34 (FIG. 4) which is adapted to be cradled about the tree trunk. Preferably this notch will include suitable tree-engaging spikes 36 for penetrating the tree trunk when the device 10 is properly installed. Weight from the apparatus 10 and the hunter supported thereby will tend to frictionally bind the chain about the tree trunk and urge spikes 36 into penetrating engagement with the trunk.

Figure 4:
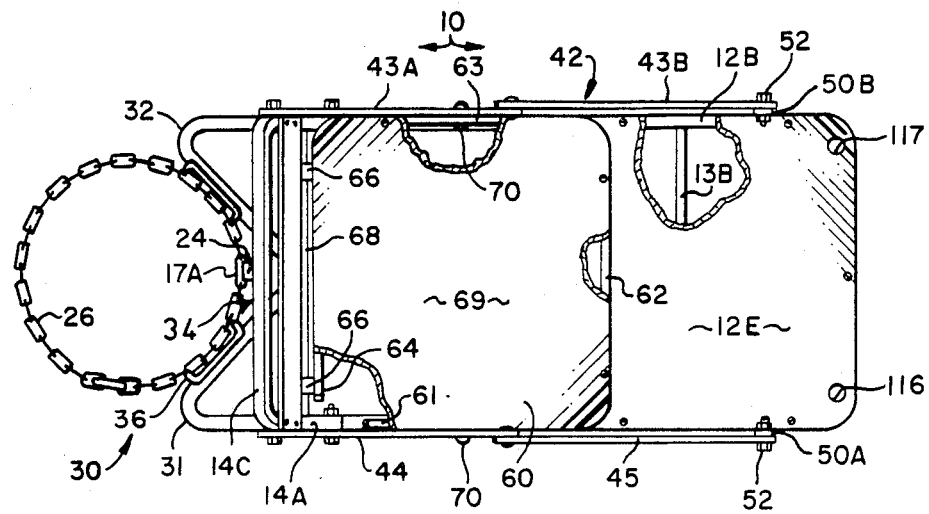
FIG. 4 is an enlarged fragmentary top plan view of the tree stand in its deployed position.

As best viewed in FIGS. 1, 4, and 5, the first and second frame members are operatively maintained in proper position by a pair of identical articulated lateral support struts generally designated by the reference numerals 40 and 42. Each strut 40 and 42 includes a similar pair of segments which are pivoted together to facilitate folding. For example, member 40 includes segments 44 and 45 pivoted together at an intermediate connection point 46, and member 42 includes similar segments 43A and 43B. Segment 44 is pivotally connected at its top to side 14A of the second frame member at point 48, and the lower segment 45 is pivotally coupled to the top of a suitable pivot support brace 50A by a suitable nut and bolt combination 52.

Pivot braces 50A and 50B are welded to the opposite sides 12A and 12B of frame member 12 and are oriented substantially vertically with respect thereto. Lateral support strut 42 is similarly pivoted to brace 50B, and pivot points 57 and 58 (FIG. 2) thus establish an axis of rotation, which is vertically offset from the plane of frame member 12 to insure adequate folding of the various constituent parts of the apparatus 10.

A generally rectangular seat member 60 is foldably associated with the apparatus 10, and it is preferably pivotally disposed between the previously discussed lateral support members. Seat 60 includes a pair of parallel spaced apart sides 61 and 63 joined by an integral cross piece 62. The rear cross piece 64 of the seat member 60 includes a pair of spaced apart, channel-like brackets 66 which are adapted, when the device 10 is assembled, to be fitted to the intermediate brace 68 of the second frame member 14. A planar surface 69 is fitted to the top of the seat member for supporting the hunter. This seat assembly 60 is preferably pivotally disposed between the upper members 44 and 43A of the previously discussed lateral support members 40 and 42, and a pivot point is established at 70.

With further reference directed to FIG. 2, a swing mount assembly 80 extends downwardly beneath the first frame member 12, and it is adapted to provide support for a suitable conventional pulley 83 or the like. The ropes associated with the pulley assembly may suspend a deer for cleaning, or they may temporarily elevate certain supplies or materials beneath the tree stand 10 out of reach of wild animals or other hunters. The swing mount assembly 80 is comprised of a rigid strut 84 which terminates in oppositely disposed brackets 86 and 88. The latter brackets are adapted to be pivotally coupled to the bottoms of the pivot brackets 50A and 50B, an axis of rotation being established by removable pin assemblies 90 and 91. Thus the swing mount assembly may be temporarily mounted upon the stand 10 when necessitated by the user and may otherwise be omitted from the assembly. A lower ring 94 permanently welded in the center of tubular member 84 extends downwardly to receive a suitable hook or rope tie (shown in dashed lines in FIG. 2) upon which the desired cargo may be suspended.

With reference directed again to FIG. 1, both convenient access from the ground 95 to the deployed stand device 10 and additional vertical support are provided 10 by the ladder assembly generally designated by the reference numeral 100. Ladder assembly 100 is comprised of a plurality of individual segments which are adapted to be axially fitted together. For example, an upper ladder section 102 having tubular sides 104 and 106 and rungs 111 may be fitted to a lower ladder section 108 having sides 110 and 112 and rungs 111A. A pair of reduced dimension extensions 110A and 112A extending from the top of segment 108 are received by segment 102 within the tubular bottoms of sides 104 and 106. Hooks 113 and 114 at the top of the upper ladder segment 102 are adapted to be received within suitable orifices 116 and 117 (FIG. 2) defined within foot rest board 12E, whereby to suspend the ladder assembly from the elevated stand assembly 10.

To initially install the device, the ladder assembly may be first partially assembled so that initial access to an elevated position for installation of the chain 26 about the tree. Then the apparatus 10 will assume the position generally indicated in FIG. 6, and unfolding of the various parts may commence.

A reinforcing rod 122 terminates at its outer end in a tubular collar 124 permanently, pivotally mounted about an appropriate rung 111E of the upper ladder segment 102. Rod 122 may pivot between a deployed position extending between the vertically disposed ladder 100 and the supporting tree 11. (FIG. 1), and a transportable position in which the rod may be folded for storage. The user may set the rod 122 at a multiplicity of intermediate positions, depending upon the angular position of the stand device 10 relative to the supporting tree 11 to thus adjust the assembly for maximum stability and safety. The opposite end of rod 122 is provided with a suitable orifice through which the user may thread a conventional rope 126 for temporarily securing the rod to the tree whereby to brace the apparatus 10.

Figure 6:
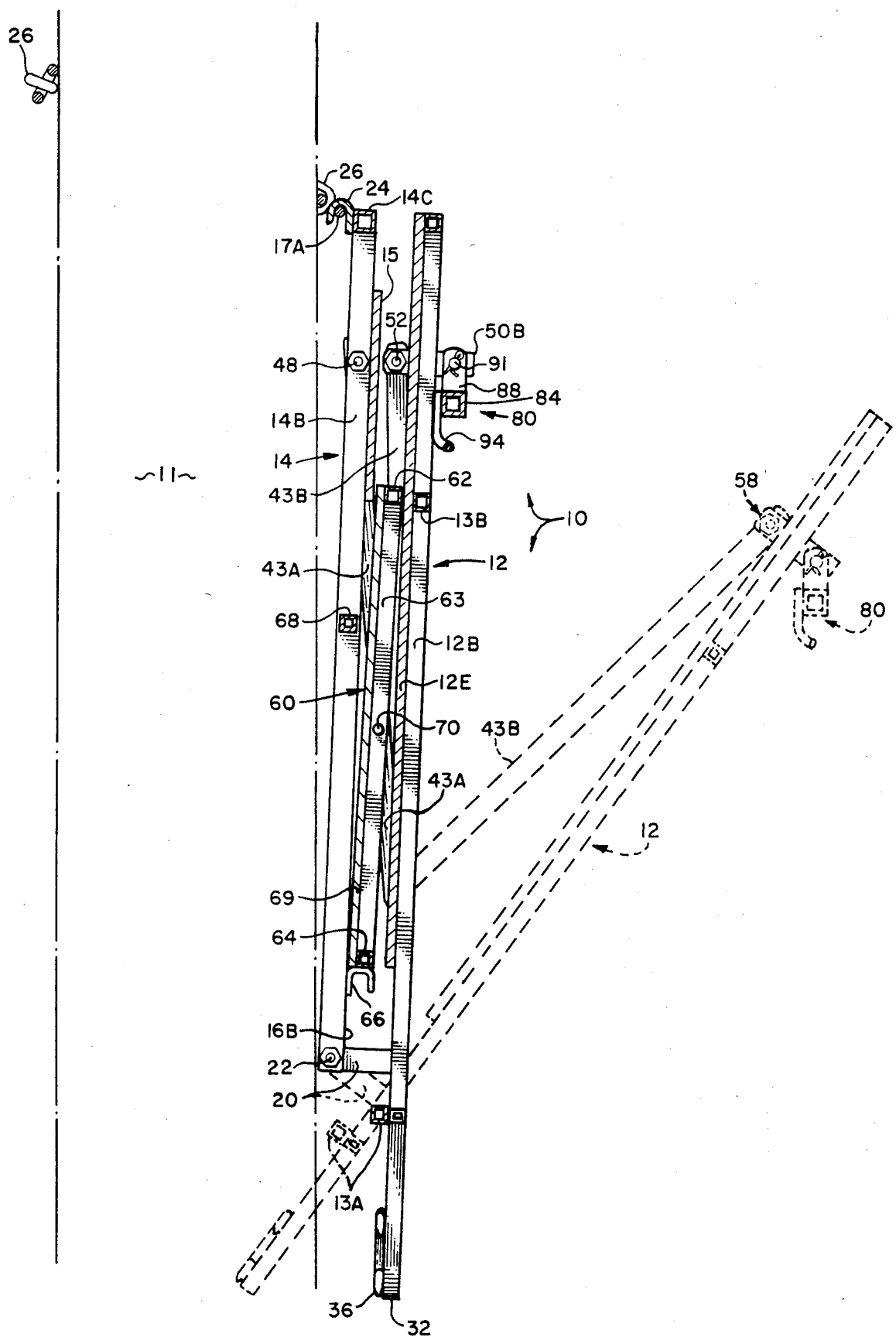

In operation, the tree stand 10 may be conveniently transported in its flat, "closed" positions wherein the first and second frame members 12 and 14 flatly sandwich the seat 60 (FIG. 6), and the lateral support strut portions (i.e. 43A, 43B) are folded together as shown in FIG. 6 and stacked compactly with the ladder assembly 100. Rope 126 will be free for manipulating the device 10 as desired by the user. It will be understood that when folded the device 10 may assume a horizontal position; the "vertical" orientation of FIG. 6 illustrates the device 10 immediately prior to unfolding once the chain is appropriately tied around the tree.

After the user locates an appropriate tree 11 he may merely untie the rope and lay the unfolded assembly on the ground nearby. The user maay then assemble the ladder assembly by fitting together appropriate ladder segments. The ladder may then be supported against the trunk of the selected tree 11, permitting the user to safely ascend the tree trunk and tightly secure the chain 26 about the tree trunk at a suitable desired elevation. The user may then carry the entire folded stand device 10 up the latter and securely mount it upon the tree by sliding hook 24 of the second frame portion 14 into a selected link 17A of the chain 26. This is conveniently accomplished when the lightweight stand 10 is disposed in the "closed" or folded position of FIG. 6.

Having thus secured the stand 10 upon a chain link 17A, the user may subsequently pivot and thus lower first frame portion 12, passing it through the various intermediate positions illustrated in dashed lines in FIG. 6 to a generally horizontal position perpendicular to the second frame portion 14. During this rotation the lateral support struts extend outwardly to the illustrated substantially linear position (FIG. 1), being disposed at an angle of approximately forty-five degrees relative to the planes of the frame members 12 and 14. The seat member 60 will cooperatively pivot into a substantially horizontal position, after which the seat brackets 66 may be mated to the intermediate brace 68 previously described. The critical rotation described is facilitated by the offset mounts 18 and 20 and by offsetting established by the pivot braces 50A and 50B previously described. The M-shaped portions at the rear of the first frame member 12 is then urged directly into circumferential contact with the tree 11 and the spikes 36 will forcibly penetrate the tree tunk.

After the stand assembly 10 is thus secured upon the tree trunk, the user may then reposition the ladder assembly 100 by slidably engaging the ladder hooks 113 and 114 at the upper end into orifices 116 and 117 and suitably supporting the lower end of the ladder firmly against ground 95 at an angle calculated to provide maximum stability of the device. If desired, the rod 122 may then be pivoted downward to a suitable position against the trunk of tree 11 and secured thereto with rope 126. The pulley assembly 83 may then be hung in position upon the swing mount assembly 80 below the first frame member 12.

Having so secured the device, the user may then safely ascend the ladder 100 and assume a comfortable, seated position for observation of the surrounding area. When desired, the user may also temporarily, securely abandon the stand 10 by simply descending the ladder and subsequently disengaging the ladder assembly from the first frame member 12. The disassembled ladder sections may be easily carried away or stored in another location, so that stand will remain temporarily in an elevated, relatively inaccessible position.

The tree stand 10 may at the user's convenience be disengaged from the tree and disassembled in a similar manner. The entire assembly may then be again easily folded together, securely wound and tied with the rope, and easily transported from the observation area.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A collapsible, portable tree stand assembly for use by hunters, outdoorsmen or a smiliar user for positioning the user at a suitable elevation above the ground upon the trunk of a tree or similar vertical support, said tree stand assembly comprising:
   a rigid, generally rectangular first frame member adapted to forcibly contact said tree, said first frame member adapted to function as a foot support when said first frame member is disposed in a deployed, generally horizontal position;
   a rigid, generally rectangler second frame member pivotally coupled to and offset from said first frame member and adapted to be disposed, when said assembly is unfolded and hooked to a suitable chain upon a suitable tree, in a generally perpendicular position relative to the ground to provide back support for said user;
   a pair of cooperating, lateral support struts operatively extending between said first and second frame members upon opposite outer sides of said assembly for maintaining said first and second frame members in proper operative relation when said assembly is deployed, each of said support struts comprising:
   first strut portions having a first end pivotally coupled to opposite top sides of said second frame member and a second end; and,
   second strut portions having a first end pivotally coupled to the second end of said first strut portions, and said second strut portions having a second end pivotally secured at the front of said second frame member to offsetting pivot braces;
   a rigid generally rectangular seat member pivotally coupled between said lateral support struts; and,
   elongated multi-segment ladder means for facilitating ingress and egress to said assembly for said user.

2. The tree stand assembly as defined in claim 1 wherein said seat member is pivoted between the first strut portions of said lateral support members above the second ends of said first strut portions.

3. The tree stand assembly as defined in claim 2 wherein said second frame member includes an intermediate brace, and said seat member includes rear bracket means adapted to be coupled to said intermediate brace when said tree stand is deployed whereby to secure said seat member.

4. The tree stand assembly as defined in claim 3 wherein said first frame portion comprises an integral, generally M-shaped inner end for abutting the tree trunk, said inner end provided with spikes for forcibly penetrating the trunk of the selected tree to further reinforce said assembly.

5. The tree stand assembly as defined in claim 3 including a rigid, elongated reinforcing rod adapted to be extended between said ladder means and said tree for further reinforcing said assembly in a proper deployed position.

6. The tree stand assembly as defined in claim 5 wherein said ladder means comprises a plurality of individual rung-equipped segments of approximately equal length adapted to be axially fitted together, and said reinforcing rod includes collar means for pivotally coupling it at one of its ends to one of the ladder means rungs.

7. The tree stand assembly as defined in claim 5 wherein said first frame member includes a swing mount assembly for selectively suspending a desired item above the ground beneath the front of said first frame member.

8. A portable, foldable tree stand assembly for use by hunters or the like, said tree stand assembly comprising:
   a rigid, generally rectangular first frame portion adapted to provide a foot rest, said first frame portion comprising generally M-shaped means for contacting a tree when said tree stand assembly is deployed;
   a rigid, generally rectangular, second frame portion adapted to be suspended by a suitable chain circumferentially mounted on the selected tree, said second frame portion pivotally associated with said first frame portion and including a pair of rigid sides and a rigid crossmember extending between said sides;
   a pair of cooperating lateral support struts adapted to maintain said first and second frame portions when deployed in stable, cooperative, generally perpendicular relationship, said struts comprising first and second strut portions, wherein:
      said first strut portions are adapted to be pivotally secured at one end to opposite sides of said second frame portion and pivotally coupled to its opposite end to said second strut portion; and,
      said second strut portions are adapted to be pivotally coupled at one end into offsetting pivot braces provided upon opposite sides of said first frame portion;
   a rigid, planar, generally rectangular seat pivotally deployed between said lateral support struts, said seat adapted to be pivotally unfolded to a deployed position wherein it engages said rigid crossmember of said second frame portion; and,
   an elongated, segmented ladder assembly for facilitating access to said stand assembly.

9. The tree stand assembly as defined in claim 8 wherein said second frame portion includes rigid hook means for selectively engaging said chain.

10. The tree stand assembly as defined in claim 9 including a pivotal swing mount assembly for suspending a deer or the like above ground beneath the stand assembly.

11. The tree stand assembly as defined in claim 10 wherein said seat member includes rear bracket means adapted to be coupled to said rigid crossmember when said tree stand is deployed.

12. The tree stand assembly as defined in claim 11 including an elongated, rigid rod pivotally coupled to said ladder assembly for contacting said tree to brace said stand assembly, said rod including a tubular collar adapted to be permanently, pivotally mounted about a ladder rung.

13. A portable, foldable tree stand assembly for use by hunters or the like, said tree stand assembly adapted to be transported in a folded generally horizontal position and deployed by unfolding, said tree stand assembly comprising:
   a rigid, generally rectangular first frame portion adapted to provide a foot rest, said first frame portion comprising generally M-shaped means for contacting a tree when said tree stand assembly is deployed;
   a rigid, generally rectangular, second frame portion adapted to be suspended by a suitable chain circumferentially mounted on the selected tree, said second frame portion pivotally associated with said first frame portion and including a pair of rigid sides and a rigid crossmember extending between said sides;
   a pair of cooperating lateral support struts adapted to maintain said first and second frame portions when deployed in stable, cooperative, generally perpendicular relationship, said struts comprising first and second strut portions, wherein:
      said first strut portions are adapted to be pivotally secured at one end to opposite sides of said second frame portion and pivotally coupled at its opposite end to said second strut portion; and,
      said second strut portions are adapted to be pivotally coupled at one end into offsetting pivot braces provided upon opposite sides of said first frame portion;
   a rigid, planar, generally rectangular seat pivotally deployed between said lateral support struts, said seat adapted to be pivotally unfolded to a deployed position wherein it engages said rigid crossmember of said second frame portion, said seat including rear bracket means adapted to be coupled to said rigid crossmember when said tree stand is deployed;
   an elongated, segmented ladder assembly for facilitating access to said stand assembly; and,
   an elongated, rigid reinforcement rod pivotally coupled to said ladder assembly for contacting said tree to brace said stand assembly, said rod including a tubular collar adapted to be permanently, pivotally mounted about a ladder rung.

* * * * *